(12) United States Patent
Hertenstein

(10) Patent No.: US 11,562,073 B2
(45) Date of Patent: Jan. 24, 2023

(54) SYSTEMS AND METHODS OF SOFTWARE LOAD VERIFICATION

(71) Applicant: THE BOEING COMPANY, Chicago, IL (US)

(72) Inventor: Jake Daniel Hertenstein, University City, MO (US)

(73) Assignee: THE BOEING COMPANY, Chicago, IL (US)

( * ) Notice: Subject to any disclaimer, the term of this patent is extended or adjusted under 35 U.S.C. 154(b) by 498 days.

(21) Appl. No.: 16/203,411

(22) Filed: Nov. 28, 2018

(65) Prior Publication Data

US 2020/0167472 A1 May 28, 2020

(51) Int. Cl.
| | |
|---|---|
| G06F 21/57 | (2013.01) |
| H04L 9/32 | (2006.01) |
| G06F 21/51 | (2013.01) |
| G06F 8/656 | (2018.01) |

(52) U.S. Cl.
CPC .............. *G06F 21/57* (2013.01); *G06F 8/656* (2018.02); *G06F 21/51* (2013.01); *H04L 9/3247* (2013.01)

(58) Field of Classification Search
CPC ... G06F 21/57; G06F 8/75; G06F 8/61; G06F 21/51; G06F 8/656
See application file for complete search history.

(56) References Cited

U.S. PATENT DOCUMENTS

| | | | |
|---|---|---|---|
| 5,231,668 A | 7/1993 | Kravitz | |
| 5,579,511 A | 11/1996 | Cavasa et al. | |
| 5,724,425 A | 3/1998 | Chang et al. | |
| 7,636,568 B2 * | 12/2009 | Gould | B64D 47/00 455/431 |
| 8,683,266 B2 | 3/2014 | Migliasso et al. | |
| 8,806,579 B1 * | 8/2014 | Angus | G06F 21/6218 701/29.1 |
| 9,195,806 B1 * | 11/2015 | Robinson | G06F 21/79 |
| 2004/0153644 A1 * | 8/2004 | McCorkendale | G06F 21/33 713/156 |

(Continued)

FOREIGN PATENT DOCUMENTS

| | | |
|---|---|---|
| EP | 3182286 A1 | 6/2017 |
| WO | WO2016181152 A1 | 11/2016 |

*Primary Examiner* — Wei Y Zhen
*Assistant Examiner* — Brahim Bourzik
(74) *Attorney, Agent, or Firm* — Moore Intellectual Property Law, PLLC

(57) ABSTRACT

A system configured to perform software load verification. The system includes a memory, a network interface, and a processor. The memory is configured to store first data indicating expected load events. The network interface is configured to receive load verification data and a cryptographic signature from a software update target device. The load verification data is descriptive of particular load events related to loading software at the software update target device. The processor is configured to authenticate that the load verification data is received from the software update target device based on the cryptographic signature. The processor is also configured to, responsive to authenticating that the load verification data is received from the software update target device, performing a comparison of the particular load events and the expected load events. The processor is further configured to perform a response action based on results of the comparison.

20 Claims, 5 Drawing Sheets

(56) References Cited

U.S. PATENT DOCUMENTS

| | | | | |
|---|---|---|---|---|
| 2008/0165952 | A1* | 7/2008 | Smith | G06F 21/57 |
| | | | | 380/28 |
| 2008/0301447 | A1 | 12/2008 | Hughes et al. | |
| 2009/0094591 | A1* | 4/2009 | Sugimoto | G06F 8/65 |
| | | | | 717/168 |
| 2010/0152954 | A1 | 6/2010 | Ric et al. | |
| 2010/0235289 | A1 | 9/2010 | Frayssignes et al. | |
| 2013/0024727 | A1 | 1/2013 | Frayssignes et al. | |
| 2014/0033193 | A1* | 1/2014 | Palaniappan | G06F 21/57 |
| | | | | 717/173 |
| 2014/0337630 | A1* | 11/2014 | Kimberly | G06F 21/57 |
| | | | | 713/176 |
| 2016/0099811 | A1 | 4/2016 | Hawblitzel et al. | |

* cited by examiner

SYSTEMS AND METHODS OF SOFTWARE LOAD VERIFICATION

FIELD OF THE DISCLOSURE

The present disclosure is generally related to software load verification.

BACKGROUND

Software vendors often release updated versions of existing software in order to support new features or to fix issues in the software. In some networked environments, a provider device sends software (e.g., updates) via the network to other devices. Prior to distributing the software to the devices, the provider device verifies the software (e.g., by scanning or debugging the software). After receiving the software from the provider device via the network, the devices load the software (e.g., to perform a software update).

In some cases, a software update is performed "offline." For example, a computer system may receive the software and may load the software to perform the software update without notification to the provider device. In some circumstances, because a device is "offline," the provider device may be unaware of the particular configuration of the device or version of the software at the device. The provider device, based on an outdated configuration of the device, could send software (or other data) to the device that is incompatible with an updated configuration of the device. In this case, the provider device is unable to verify whether the software that was sent to the device has been installed correctly at the device.

SUMMARY

In a particular implementation, a system is configured to perform software load verification. The system includes a memory, a network interface, and a processor. The memory is configured to store first data indicating expected load events. The network interface is configured to receive load verification data and a cryptographic signature from a software update target device. The load verification data is descriptive of particular load events related to loading software at the software update target device. The processor is configured to authenticate that the load verification data is received from the software update target device based on the cryptographic signature. The processor is also configured to, responsive to authenticating that the load verification data is received from the software update target device, perform a comparison of the particular load events and the expected load events. The processor is further configured to perform a response action based on results of the comparison.

In another particular implementation, an aircraft includes a network interface and a processor. The network interface is configured to receive, via a network from an off-board device, a software package that includes software. The processor is configured to authenticate, based on a digital signature, that the software is received from the off-board device. The processor is also configured, responsive to authenticating the software, to perform particular load events associated with loading the software. The processor is further configured to cause the network interface to send load verification data and a cryptographic signature to the off-board device. The load verification data indicates the particular load events. The processor is also configured to receive, via the network interface, a response message from the off-board device. The response message is based on analysis of the load verification data and the cryptographic signature at the off-board device. The processor is further configured to selectively execute the software based on the response message.

In another particular implementation, a method includes accessing, at an off-board device, first data indicating expected load events. The method also includes receiving load verification data and a cryptographic signature at the off-board device from a software update target device. The load verification data is descriptive of particular load events related to loading software at the software update target device. The method further includes authenticating, at the off-board device, that the load verification data is received from the software update target device based on the cryptographic signature. The method also includes, responsive to authenticating that the load verification data is received from the software update target device, performing a comparison of the particular load events and the expected load events. The method further includes performing, at the off-board device, a response action based on results of the comparison.

The features, functions, and advantages described herein can be achieved independently in various implementations or may be combined in yet other implementations, further details of which can be found with reference to the following description and drawings.

DETAILED DESCRIPTION

Figure 1:
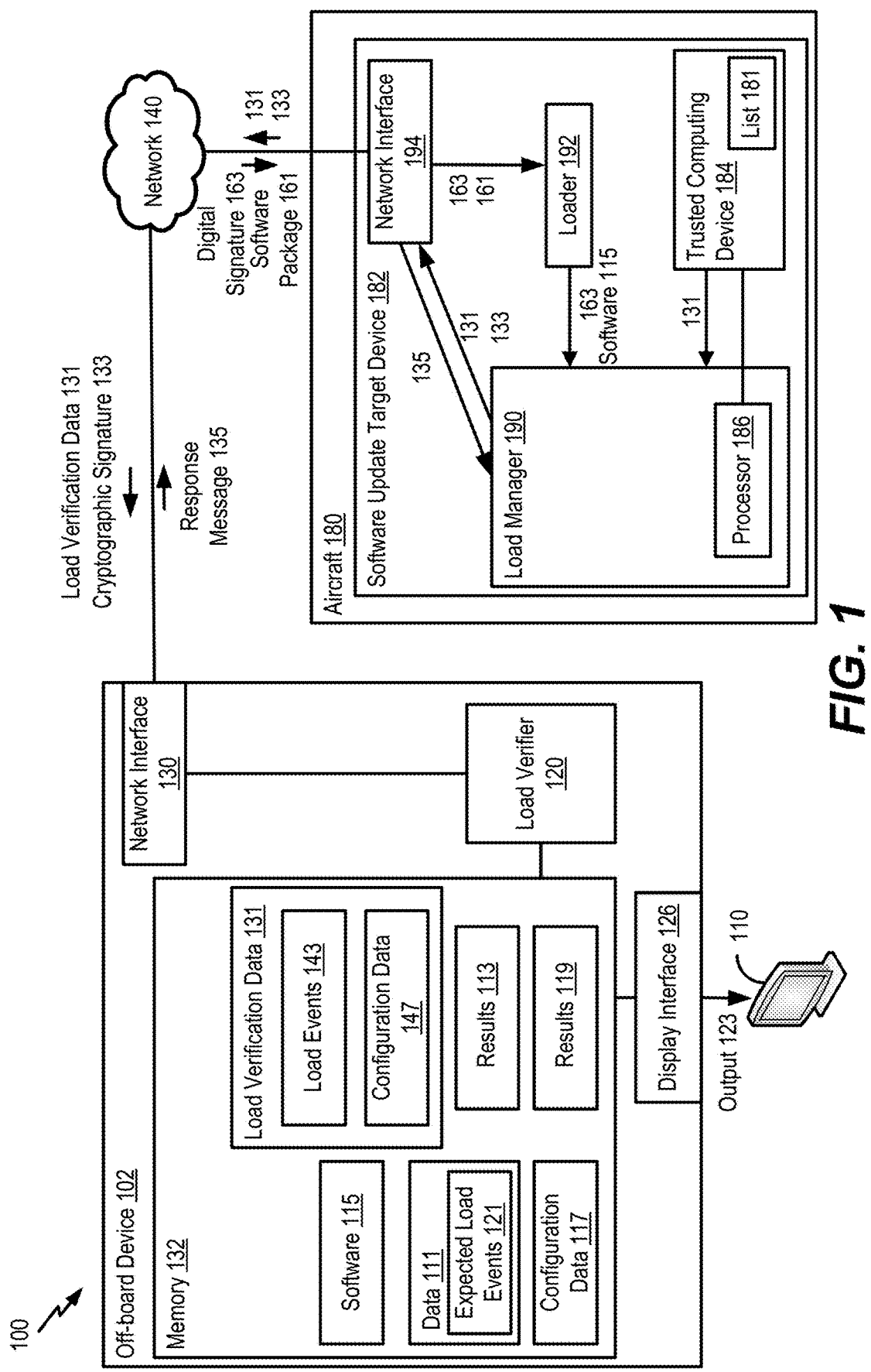
FIG. 1 is a block diagram that illustrates a system operable to perform software load verification.

Implementations described herein are directed to software load verification. For example, a load verifier (e.g., a software provider/source) has access to data indicating load events that are expected during loading of particular software at a target device, such as a computer system of an aircraft. In a particular example, the load verifier also has access to first configuration data indicating an expected configuration of the target device (e.g., the computer system). The load verifier receives load verification data, a cryptographic signature, or both. The load verifier determines, based on the cryptographic signature, that the load verification data was sent by a load manager (e.g., a network device). The load verifier is off-board the aircraft. For example, an off-board device includes the load verifier. The load verification data indicates particular load events that are associated with loading the software at the target device. In some examples, the software is loaded at the target device to perform a software update while the target device is offline from the load verifier. In a particular example, the load verification data also includes second configuration data indicating a configuration of the target device prior to loading the software.

The load verifier compares the particular load events with the expected load events. The load verifier determines, in response to determining that the particular load events match the expected load events, that the software was successfully loaded at the target device. In a particular example, the load verifier compares the first configuration data to the second configuration data to determine whether the configuration of the target device matches the expected configuration of the target device. In this case, a response action initiated by the load verifier can include sending a response message to the target device. For example, the load verifier sends an approval message to the target device in response to determining that the particular load events match the expected load events, that the configuration matches the expected configuration, or both. The target device executes the software in response to receiving the approval message.

Alternatively, in some cases, the load verifier identifies that the load verification data indicates that the particular load events differ from the expected load events. In this case, a response action initiated by the load verifier can include sending a disable message in response to determining that the particular load events do not match the expected load events, the configuration does not match the expected configuration, or both. The target device prevents execution of the software in response to receiving the disable message. In some examples, the response action initiated by the load verifier includes generating an alert, displaying the alert, sending the alert to another device (e.g., a communication device) of a user (e.g., an IT administrator), or a combination thereof. In a particular example, the load verifier re-sends the software to the software update target device to initiate a reload of the software. In some examples, the load verifier selects other software based on the configuration of the target device and initiates loading of the other software at the target device.

The load verifier can thus verify that the configuration of the target device prior to loading the software matches the expected configuration and that the software was successfully loaded at the target device. The load verifier updates the first configuration data based on the load verification data to indicate an updated configuration of the target device. In some cases, a technical benefit is that a target device (e.g., a computer system of an aircraft) can be prevented (e.g., via the disable message) from executing a software update that is incorrectly loaded, that is incompatible with a configuration of the target device, or both. For example, in cases where configuration of the target device is updated while the target device is offline, the load verifier prevents execution of software that was selected for the target device based on the outdated configuration.

FIG. 1 is a block diagram of a system 100 that is operable to perform software load verification. The system 100 includes an aircraft 180 coupled via a network 140 to an off-board device 102. The network 140 includes a wired network, a wireless network, or both. The aircraft 180 includes a software update target device 182. It should be understood that the aircraft 180 including the software update target device 182 is provided as an illustrative example. In some aspects, the software update target device 182, or components thereof, is integrated into a server, an unmanned vehicle, a manned vehicle, a boat, a car, a computing device, a communication device, a navigation device, or a combination thereof. In a particular aspect, the software update target device 182 corresponds to a device, multiple devices, a system, multiple systems, or a combination thereof. In a particular example, the software update target device 182 corresponds to one or more components of the aircraft 180. In FIG. 1, the software update target device 182 includes a trusted computing device 184, a load manager 190, a loader 192, and a network interface 194. The load manager 190 includes a processor 186.

In a particular aspect, the trusted computing device 184 is loaded with an encryption key that is inaccessible by other components of the software update target device 182. For example, the trusted computing device 184 is provided a private encryption key by a manufacturer of the trusted computing device 184, a manufacturer of another device, an airline, or a combination thereof. In a particular aspect, the private encryption key corresponds to a configuration setting, default data, user input, or a combination thereof. The private encryption key corresponds to (e.g., is paired with) a public encryption key. In a particular example, the trusted computing device 184 uses a key generation technique (e.g., an asymmetric cryptography algorithm) to generate the private encryption key and the public encryption key. The public encryption key is used by other components of the software update target device 182 to encrypt data sent to the trusted computing device 184 and to decrypt data received from the trusted computing device 184.

The loader 192 is configured to receive a software package 161, extract software 115 from the software package 161, and provide the software 115 to the load manager 190. The processor 186 is configured to perform load events 143 by loading the software 115. The trusted computing device 184 is configured to monitor operations of the processor 186 and to generate a list 181 indicating the load events 143. In a particular aspect, the load events 143 include performing a memory operation, initiating a process, or both. The load events 143 include, for example, the processor 186 performing a data write operation to a particular type of device, initiating a boot process, generating a signature, detecting an error, or a combination thereof. It should be understood that the list 181 is provided as an illustrative example. In some implementations, the trusted computing device 184 is configured to generate a table, a set, an array, or other data structure indicating the load events 143. The trusted computing device 184 is configured to generate the load verification data 131 based on the list 181.

The off-board device 102 includes a memory 132 coupled to a load verifier 120 and to a display interface 126. In FIG. 1, the display interface 126 is coupled to a display 110. The load verifier 120 is coupled, via a network interface 130, to the network 140. In a particular aspect, the network interface 130 includes a serial port, a hardware port, a network interface controller, a network interface device, a network socket, a network interface card, a serial network interface, a physical interface, or a combination thereof.

The memory 132 is configured to store configuration data 117 indicating a configuration (e.g., a previous configuration) of the software update target device 182. For example, the configuration data 117 indicates a type of software, a version of the software, a type of hardware, a version of the hardware, or a combination thereof, installed at (or coupled to) the software update target device 182. In a particular aspect, the software update target device 182, a technician, or both, provide the configuration data 117 to the off-board device 102 during a registration phase in which the software update target device 182, the aircraft 180, or both, are registered with the off-board device 102. For example, the configuration data 117 indicates an initial configuration of the software update target device 182. Over time, the load verifier 120 is configured to update the configuration data 117 based on changes to software (e.g., software updates, applications, or a combination thereof), hardware, or both, of (or coupled to) the software update target device 182. For example, the load verifier 120 is configured to update the configuration data 117 in response to detecting that software (e.g., an application or an update) is successfully loaded, that the software is deleted, that the software is restricted from execution, that hardware is successfully installed, that the hardware is removed, or a combination thereof. The load verifier 120 is configured to detect the changes to the software, the hardware, or both, of the software update target device 182 based on user input, data received from the software update target device 182, or both.

The memory 132 is configured to store the software 115 and data 111 indicating expected load events 121 associated with loading the software 115. For example, the off-board device 102 receives the software 115, the data 111, or a combination thereof, from a user (e.g., an information technology (IT) administrator), another device, or both. In a particular implementation, an IT administrator initiates loading of the software 115 by a processor of a test system. The test system generates the data 111 indicating the expected load events 121 by monitoring the operations of the processor during the loading of the software 115. The IT administrator, the test system, or both, provide the software 115, the data 111, or a combination thereof, to the off-board device 102.

The load verifier 120 is configured to receive the load verification data 131 indicating the load events 143 from the software update target device 182 and to determine whether loading of the software 115 was successful based on a comparison of the load events 143 and the expected load events 121. The load verifier 120 is configured to generate a response message 135 including an approval message or a disable message based on determining whether loading of the software 115 was successful. The load verifier 120 is configured to send the response message 135 to the software update target device 182. The load manager 190 is configured to selectively execute the software 115 based on the response message 135. For example, the load manager 190 is configured to prevent execution of the software 115 in response to determining that the response message 135 includes a disable message. Alternatively, the load manager 190 is configured to execute the software 115 in response to determining that the response message 135 includes an approval message.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

During operation, the load verifier 120 determines that the software 115 is to be loaded at the software update target device 182. In a particular aspect, the load verifier 120 receives an input (e.g., a user input from a user, a command from a device, a request from the software update target device 182, or a combination thereof) indicating that the software 115 is to be loaded to the software update target device 182. In another aspect, the input indicates that the software 115 is to be loaded to any target device (e.g., any computer system of an aircraft) that satisfies a loading criterion. The load verifier 120, in response to determining that the software update target device 182 satisfies the loading criterion, determines that the software 115 is to be loaded to the software update target device 182. For example, the load verifier 120 determines that the software update target device 182 satisfies the loading criterion in response to determining that the software update target device 182 is within a communication range of the off-board device 102, that a configuration of the software update target device 182 indicated by the configuration data 117 satisfies a configuration criterion indicated by the loading criterion, that an input indicates that the software update target device 182 is available for an update, or a combination thereof. The load verifier 120, in response to determining that the software 115 is to be loaded to the software update target device 182, generates a digital signature 163 of the software 115. For example, the load verifier 120 generates a hash by applying a one-way hash function to the software 115. In a particular aspect, the load verifier 120 generates an encrypted hash by encrypting the hash based on a private key of the off-board device 102. The digital signature 163 includes the software 115, the hash of the software 115, the encrypted hash, or a combination thereof.

The load verifier 120 generates the software package 161 based on the software 115. For example, the load verifier 120 generates the software package 161 by performing encryption, data compression, or both, on the software 115. In a particular aspect, the load verifier 120 generates compressed data by performing data compression of the software 115, and generates the software package 161 by encrypting the compressed data based on the private key of the off-board device 102. In an alternative aspect, the load verifier 120 generates encrypted data by encrypting the software 115 based on the private key of the off-board device 102 and generates the software package 161 by performing data compression on the encrypted data.

The load verifier 120 sends the software package 161, the digital signature 163, or both, to the software update target device 182. For example, the network interface 130 sends the software package 161, the digital signature 163, or both, via the network 140 to the aircraft 180. The network interface 194 forwards the software package 161, the digital signature 163, or both, received from the network 140 to the loader 192.

The loader 192 extracts the software 115 from the software package 161. For example, the loader 192 extracts the software 115 by applying data decompression, decryption based on a public key of the off-board device 102, or both, to the software package 161. In a particular aspect, the loader 192 generates decrypted data by decrypting the software package 161 based on the public key of the off-board device 102 and extracts the software 115 by performing data decompression on the decrypted data. In an alternative aspect, the loader 192 generates decompressed data by performing data decompression of the software package 161, and extracts the software 115 by decrypting the decompressed data based on the public key of the off-board device 102. The loader 192 provides the software 115, the digital signature 163, or both, to the load manager 190.

The load manager 190 (e.g., the processor 186) authenticates, based on the digital signature 163, that the software 115 extracted at the software update target device 182 is received from the off-board device 102, the load verifier 120, or both. For example, the load manager 190 generates a second digital signature of the software 115 and determines whether the second digital signature matches the digital signature 163 received by the software update target device 182. To illustrate, the load manager 190 generates the second digital signature by generating a second hash of the software 115 extracted at the software update target device 182. The load manager 190 extracts the hash (generated by the load verifier 120) by decrypting the digital signature 163 using the public key of the off-board device 102. The load manager 190 determines that the second digital signature matches the digital signature 163 in response to determining that the second hash (generated at the software update target device 182) matches the hash (generated at the off-board device 102). The load manager 190 authenticates that the software 115 is received from the off-board device 102, the load verifier 120, or both, in response to determining that the second digital signature matches the digital signature 163.

The load manager 190 determines that the software 115 is to be loaded in response to authenticating that the software 115 is received from the load verifier 120, the off-board device 102, or both, extracting the software 115, or a combination thereof. In a particular aspect, the load manager 190 generates the configuration data 147 in response to determining that the software 115 is to be loaded. The configuration data 147 indicates a configuration of the software update target device 182, a configuration of the aircraft 180, or both, prior to loading of the software 115. For example, the configuration data 147 indicates a type of software, a version of the software, a type of hardware, a version of the hardware, or a combination thereof, installed at (or coupled to) the software update target device 182, the aircraft 180, or both. The processor 186 loads (e.g., installs) the software 115 in response to authenticating that the software 115 was sent by the off-board device 102.

The trusted computing device 184 monitors operations of the processor 186 during loading of the software 115. In a particular aspect, the trusted computing device 184 initiates the monitoring in response to receiving a monitoring request from the processor 186 and continues the monitoring until receiving a stop monitoring request from the processor 186. In an alternative aspect, the trusted computing device 184 monitors operations of the processor 186 independently of receiving the monitoring request. For example, the trusted computing device 184 monitors all operations of the processor 186.

The trusted computing device 184 detects occurrence of the load events 143 during the loading of the software 115 by the processor 186. In a particular aspect, the load events 143 include the processor 186 (or another device) generating a self-attestation message, the processor 186 (or another device) generating a self-attestation signature, the processor 186 successfully performing a boot process, the processor 186 detecting an error in performing the boot process, the processor 186 successfully performing a data transfer process, the processor 186 detecting an error in performing the data transfer process, the processor 186 successfully performing a data write operation, the processor 186 detecting an error in performance of the data write operation, an identifier of a particular user of the aircraft 180, a signature (e.g., a hash of the identifier) of the particular user of the aircraft 180, an identifier of a particular user associated with the software 115, a signature (e.g., a hash of the identifier) of the particular user associated with the software 115, a device identifier of the load manager 190, a signature of the load manager 190, a device identifier of the software update target device 182, a signature of the software update target device 182, a device identifier of the aircraft 180, a signature of the aircraft 180, a device identifier of the load verifier 120, a signature of the load verifier 120, a device identifier of the off-board device 102, a signature of the off-board device 102, a device identifier of another device of the system 100, a signature of another device of the system 100, a message that indicates a system clock time of the processor 186 (or another device), an output of the processor 186 to a system event log, a hierarchy of signatures indicating one or more of the load events 143, or a combination thereof. The trusted computing device 184 generates the list 181 indicating the load events 143.

The trusted computing device 184 generates, based on the list 181, the load verification data 131 indicating the load events 143. The trusted computing device 184 provides the load verification data 131 to the off-board device 102. For example, the trusted computing device 184 provides the load verification data 131 to the load manager 190. The load manager 190 generates a cryptographic signature 133 based on the load verification data 131. For example, the load manager 190 generates a hash by applying a one-way hash function to the load verification data 131. In a particular aspect, the load manager 190 generates an encrypted hash by encrypting the hash based on a private key of the load manager 190. The cryptographic signature 133 includes the load verification data 131, the hash of the load verification data 131, the encrypted hash, or a combination thereof.

In a particular aspect, the trusted computing device 184 generates the cryptographic signature 133. For example, the trusted computing device 184 generates a hash by applying a one-way hash function to the load verification data 131. In a particular aspect, the trusted computing device 184 generates an encrypted hash by encrypting the hash based on a private key of the trusted computing device 184. The cryptographic signature 133 includes the load verification data 131, the hash of the load verification data 131, the encrypted hash, or a combination thereof. In this aspect, the trusted computing device 184 provides the load verification data 131, the cryptographic signature 133, or both, to the load manager 190. The load manager 190 sends the load verification data 131, the cryptographic signature 133, or both, via the network 140, to the off-board device 102. For example, the load manager 190 causes the network interface 194 to send the load verification data 131, the cryptographic signature 133, or both, via the network 140, to the off-board device 102.

In a particular aspect, the digital signature 163, the cryptographic signature 133, or both, are generated based on International Telecommunication Union (ITU) X.509 standard, an elliptic curve digital signature algorithm (ECDSA), a digital signature algorithm described in U.S. Pat. No. 5,231,668, a blockchain variant, or a combination thereof.

The network interface 130 receives the load verification data 131, the cryptographic signature 133, or both, from the network 140. For example, the network interface 130 receives the load verification data 131, the cryptographic signature 133, or both, from the trusted computing device 184, the load manager 190, the software update target device 182, the aircraft 180, or a combination thereof. The load verifier 120 authenticates, based on the cryptographic signature 133, that the load verification data 131 received at the off-board device 102 was sent by the load manager 190, the trusted computing device 184, the load manager 190, the software update target device 182, the aircraft 180, or a combination thereof. For example, the load verifier 120 generates a second cryptographic signature of the load verification data 131 and determines whether the second cryptographic signature matches the cryptographic signature 133 received by the off-board device 102. To illustrate, the load verifier 120 generates the second cryptographic signature by generating a second hash of the load verification data 131 received at the off-board device 102. The load verifier 120 extracts the hash (generated by the load manager 190 or the trusted computing device 184) by decrypting the cryptographic signature 133 using the public key of the load manager 190, the trusted computing device 184, the software update target device 182, the aircraft 180, or a combination thereof. The load verifier 120 determines that the second cryptographic signature matches the cryptographic signature 133 in response to determining that the second hash (generated at the off-board device 102) matches the hash (generated at the software update target device 182). The load verifier 120, in response to determining that the second cryptographic signature matches the cryptographic signature 133, authenticates that the load verification data 131 was received from the load manager 190, the trusted computing device 184, the load manager 190, the software update target device 182, the aircraft 180, or a combination thereof.

The load verifier 120 determines that the load verification data 131 is to be analyzed in response to receiving the load verification data 131, authenticating that the load verification data 131 is received from the load manager 190, the trusted computing device 184, the load manager 190, the software update target device 182, the aircraft 180, or a combination thereof, or both. Alternatively, the load verifier 120 discards the load verification data 131 in response to determining that the second cryptographic signature does not match the cryptographic signature 133.

In a particular aspect, the load verifier 120, in response to determining that the load verification data 131 is to be analyzed, compares the configuration data 147 to the configuration data 117. For example, the load verifier 120 accesses the configuration data 117 indicating an expected configuration of the software update target device 182, the aircraft 180, or both. The load verifier 120 generates results 119 based on a comparison of the configuration data 147 and the configuration data 117.

In a particular example, the load verifier 120 determines that the configuration data 147 matches the configuration data 117 in response to determining that a detected configuration indicated by the configuration data 147 is identical to an expected configuration indicated by the configuration data 117. In a particular example, the load verifier 120 determines that the configuration data 147 matches the configuration data 117 in response to determining that the detected configuration is compatible with (e.g., substantially identical to) the expected configuration. As an illustrative example, the configuration data 147 indicates that a first portion (e.g., a configuration setting, a software version, a hardware version, a type of software, a type of hardware, or a combination thereof) of the detected configuration is different from a second portion of the expected configuration. The load verifier 120 determines that the configuration data 147 matches the configuration data 117 independently of the first portion matching the second portion. In a particular aspect, the data 111 identifies configuration parameters (e.g., related to the software 115) that are to be compared to determine whether the configuration data 117 matches the configuration data 147. In a particular aspect, the data 111 indicates a set of values of a configuration parameter that are considered a match for a particular value of the configuration parameter.

The load verifier 120, in response to determining that the results 119 indicate that the configuration data 147 (e.g., the configuration detected at the software update target device 182) does not match the configuration data 117 (e.g., the expected configuration), performs a response action including generating a disable message as the response message 135. The disable message indicates that the software 115 is not approved for execution at the processor 186, the software update target device 182, the aircraft 180, or a combination thereof. Alternatively, the load verifier 120, in response to determining that the load verification data 131 is to be analyzed, that the configuration data 147 (e.g., the configuration detected at the software update target device 182) matches the configuration data 117 (e.g., the expected configuration), or both, performs a comparison of the load events 143 indicated by the load verification data 131 and the expected load events 121 indicated by the data 111. For example, the load verifier 120 generates results 113 based on a comparison of the load events 143 indicated by the load verification data 131 and the expected load events 121 indicated by the data 111.

In a particular example, the load verifier 120 determines that the load events 143 match the expected load events 121 in response to determining that the load events 143 are identical to the expected load events 121. In a particular example, the load verifier 120 determines that the load events 143 match the expected load events 121 in response to determining that the load events 143 are substantially identical to the expected load events 121. In a particular aspect, the data 111 identifies a subset of the expected load events 121 that are to be compared to a corresponding subset of the load events 143 to determine whether the load events 143 match the expected load events 121. In a particular aspect, the data 111 indicates a set of values corresponding to a load event that are considered a match for a particular value corresponding to the load event. To illustrate, the expected load events 121 indicate an expected time difference (e.g., 2 minutes) between initiation of a first load event (e.g., installing a first component of the software 115) and initiation of a second load event (e.g., installing a second component of the software 115). The data 111 indicates a threshold difference (e.g., a tolerance threshold) associated with the expected time difference. For example, the data 111 indicates that a detected time difference between initiation of the first load event and initiation of the second load event is considered a match to the expected time difference when the detected time difference is within the tolerance threshold of the expected time difference.

In a particular aspect, the load verifier 120 determines that the load events 143 do not match the expected load events 121 in response to determining that the load events 143 indicate presence of malware (e.g., a virus signature), that the load events 143 identify a procedure that detected an error (e.g., a bit flip), or both.

In a particular aspect, the load verifier 120 determines that the load events 143 do not match the expected load events 121 in response to determining that the load events 143, historical data, or a combination thereof, indicate a pattern corresponding to a threat. The historical data is based on previous loads of software at the processor 186, the load manager 190, the software update target device 182, the aircraft 180, or a combination thereof.

In a particular aspect, the load verifier 120 determines that the load events 143 do not match the expected load events 121 in response to determining that a timing of an event indicated by the load events 143 does not match an expected timing of the event indicated by the expected load events 121. For example, the expected load events 121 indicate an expected time difference (e.g., 2 minutes) between initiation of a first load event (e.g., installing a first component of the software 115) and initiation of a second load event (e.g., installing a second component of the software 115). The load verifier 120 determines that the load events 143 indicate a first system log message indicating initiation of the first load event at a first system clock time of the processor 186 and a second system log message indicating initiation of the second load event at a second system clock time of the processor 186. The load verifier 120 determines the timing (e.g., 30 seconds) based on a difference between the first system clock time and the second system clock time. The load verifier 120 determines that the timing (e.g., 30 seconds) does not match the expected timing (e.g., 2 minutes) in response to determining that a difference (e.g., 1 minute and 30 seconds) between the timing and the expected timing is greater than a threshold difference (e.g., 20 seconds). In some cases a mismatch between the load events 143 (e.g., the timing) and the expected load events 121 (e.g., the expected timing) indicates that the software update target device 182 is compromised. In a particular example, the software update target device 182 is infected by malware that mimics operations of an uninfected device by appearing to perform the load events 143. In this example, the mismatch between the timing and the expected timing indicates that the load events 143 did not occur correctly (e.g., did not occur).

In a particular aspect, the load verifier 120 determines that the load events 143 do not match the expected load events 121 in response to determining that the load events 143 indicate double spend events corresponding to cloning (e.g., a virtual cloning or a physical cloning) of the processor 186.

The load verifier 120, in response to determining that the results 113 indicate that the load events 143 (e.g., detected at the software update target device 182) do not match the expected load events 121, performs a response action including generating a disable message as the response message 135. In a particular aspect, the response action includes generating an alert, displaying the alert, sending the alert to another device (e.g., a communication device) of a user (e.g., an IT administrator), or a combination thereof. In a particular example, the response action includes, in response to determining that a count of reload attempts satisfies (e.g., is less than) an attempt threshold, updating (e.g., incrementing by 1) the count of reload attempts and re-sending the software 115 to the software update target device 182 to initiate a reload of the software 115. In a particular aspect, the load verifier 120 determines, based on the configuration indicated by the configuration data 147, that second software is to be provided to the software update target device 182. The load verifier 120 sends the second software to the software update target device 182 to initiate loading of the second software at the software update target device 182.

In a particular aspect, the load verifier 120, in response to determining that the results 113 indicate that the load events 143 (e.g., detected at the software update target device 182) match the expected load events 121, performs a response action including generating an approval message as the response message 135. The approval message indicates that the software 115 is approved for execution at the processor 186, the software update target device 182, the aircraft 180, or a combination thereof. In a particular aspect, the load verifier 120, in response to determining that the results 113 indicate that the load events 143 (e.g., detected at the software update target device 182) match the expected load events 121, updates the configuration data 117 based on the load verification data 131. For example, an updated version of the configuration data 117 indicates that the software 115 is loaded (e.g., installed) at the software update target device 182, the aircraft 180, or both.

In a particular aspect, performing the response action includes generating an output 123. For example, the load verifier 120 generates the output 123 indicating whether the software 115 is approved for execution at the processor 186, the software update target device 182, the aircraft 180, or a combination thereof. In a particular aspect, the output 123 indicates whether the configuration data 147 matches the configuration data 117, whether the load events 143 match the expected load events 121, or a combination thereof. In a particular aspect, the output 123 indicates the configuration data 147, the configuration data 117, the load events 143, the expected load events 121, or a combination thereof. In a particular aspect, the load verifier 120 stores the output 123 in the memory 132, provides the output 123 to the display 110, provides the output 123 to another device, or a combination thereof.

In a particular aspect, performing the response action includes sending the response message 135 to the load manager 190, the software update target device 182, the aircraft 180, or a combination thereof. When the response message 135 corresponds to a disable message, the load verifier 120 sends the response message 135 to prevent execution of the software 115 at the software update target device 182, the aircraft 180, or both. Alternatively, when the response message 135 corresponds to an approval message, the load verifier 120 sends the response message 135 to enable (e.g., initiate) execution of the software 115 at the software update target device 182, the aircraft 180, or both.

The load manager 190 receives, via the network interface 194, the response message 135 from the off-board device 102. The load manager 190 selectively executes the software 115 based on the response message 135. For example, the load manager 190, in response to determining that the response message 135 corresponds to an approval message, initiates execution of the software 115, refrains from preventing execution of the software 115, or both. For example, the load manager 190, in response to determining that the response message 135 indicates that the expected load events 121 match the load events 143, that the configuration data 117 matches the configuration data 147, or both, initiates execution of the software 115, refrains from preventing execution of the software 115, or both. Alternatively, the load manager 190, in response to determining that the response message 135 corresponds to a disable message, prevents execution of the software 115, deletes (e.g., uninstalls) the software 115, provides an alert to a display indicating that the software 115 loaded by the processor 186 is disabled, or a combination thereof. For example, the load manager 190, in response to determining that the response message 135 indicates that the expected load events 121 do not match the load events 143, that the configuration data 117 does not match the configuration data 147, or both, prevents execution of the software 115, deletes (e.g., uninstalls) the software 115, provides an alert to a display indicating that the software 115 loaded by the processor 186 is disabled, or a combination thereof.

The system 100 thus enables the load verifier 120 to selectively enable execution of the software 115 at the aircraft 180, the software update target device 182, or both, based on verifying that the configuration of the aircraft 180, the software update target device 182, or both, prior to loading the software 115 matches an expected configuration, that the load events 143 match the expected load events 121, or a combination thereof. For example, the load verifier 120, in response to determining that the configuration matches the expected configuration, that the load events 143 match the expected load events 121, or a combination thereof, sends an approval message as the response message 135 to the aircraft 180 to enable execution of the software 115 at the software update target device 182, the aircraft 180, or both. Alternatively, the load verifier 120, in response to determining that the configuration does not match the expected configuration, that the load events 143 do not match the expected load events 121, or a combination thereof, sends a disable message as the response message 135 to the software update target device 182 to prevent execution of the software 115 at the software update target device 182, the aircraft 180, or both.

Figure 2:
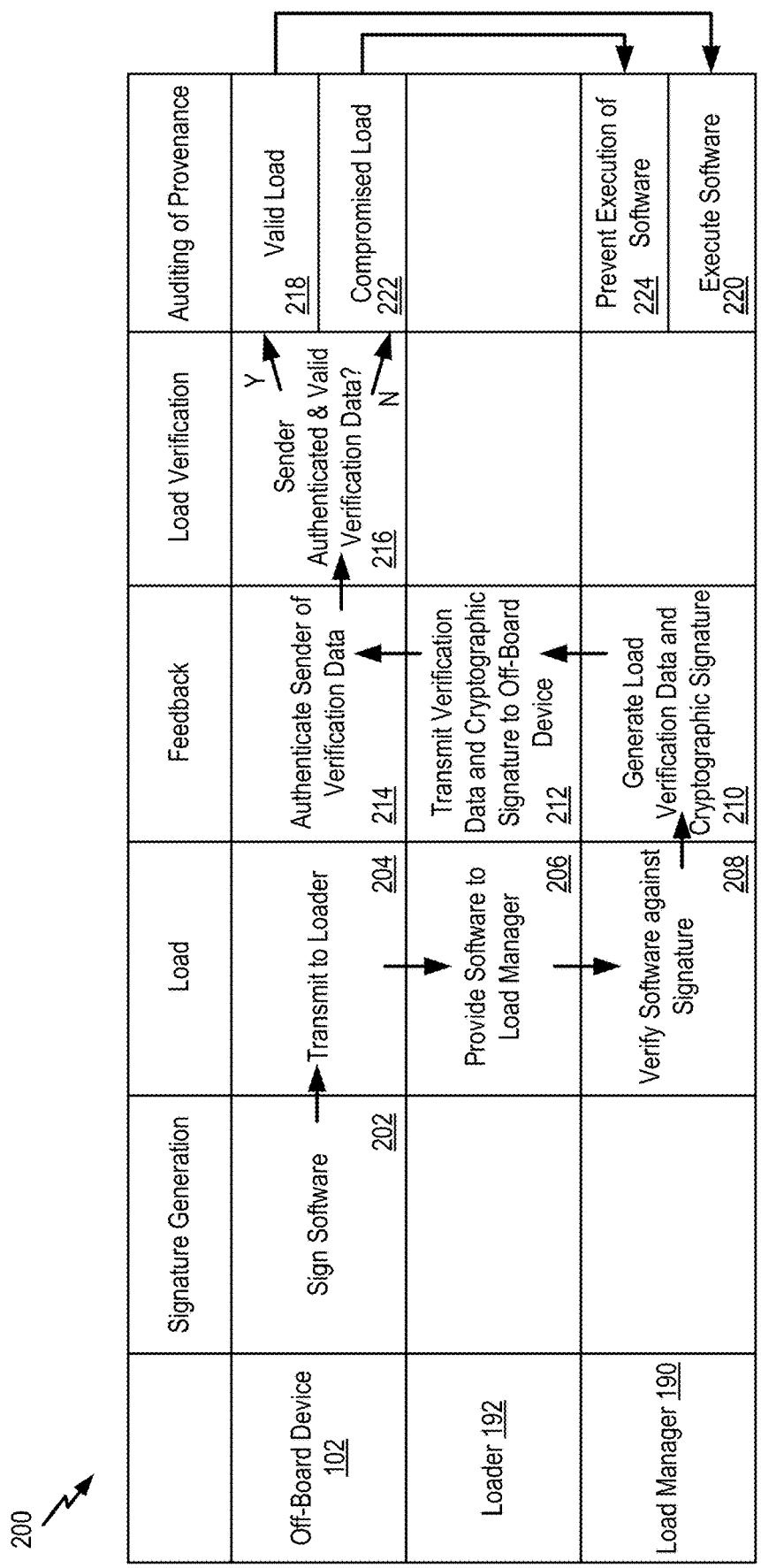
FIG. 2 is a diagram that illustrates an example of software load verification performed by the system of FIG. 1.

Referring to FIG. 2, an example of software load verification is shown and generally designated 200. One or more operations of the example 200 are performed by the load verifier 120, the off-board device 102, the trusted computing device 184, the load manager 190, the processor 186, the software update target device 182, the aircraft 180, or a combination thereof.

The example 200 includes signing software, at 202. For example, the load verifier 120 of the off-board device 102 of FIG. 1 generates the digital signature 163 based on the software 115, as described with reference to FIG. 1.

The example 200 also includes transmitting software and the signature to a loader, at 204. For example, the off-board device 102 of FIG. 1 transmits, via the network interface 130, the software package 161 and the digital signature 163 to the loader 192, as described with reference to FIG. 1. The software package 161 includes the software 115.

The example 200 further includes providing the software to a load manager, at 206. For example, the loader 192 of FIG. 1 provides the software 115 to the load manager 190, as described with reference to FIG. 1.

The example 200 also includes verifying the software against the signature, at 208. For example, the load manager 190 of FIG. 1 authenticates the software 115 based on the digital signature 163, as described with respect to FIG. 1.

The example 200 further includes generating load verification data and a cryptographic signature, at 210. For example, the load manager 190 of FIG. 1 generates the load verification data 131 and the cryptographic signature 133, as described with reference to FIG. 1. In a particular aspect, the trusted computing device 184 of FIG. 1 generates the load verification data 131, the cryptographic signature 133, or both, as described with reference to FIG. 1.

The example 200 also includes transmitting the verification data and the cryptographic signature to the off-board device, at 212. For example, the loader 192 of FIG. 1 transmits the load verification data 131 and the cryptographic signature 133 to the off-board device 102. In a particular aspect, the load manager 190 provides the load verification data 131, the cryptographic signature 133, or both, to the loader 192. In a particular aspect, the trusted computing device 184 provides the load verification data 131, the cryptographic signature 133, or both, to the loader 192. The loader 192 transmits, via the network interface 194, the load verification data 131, the cryptographic signature 133, or both, to the off-board device 102. In a particular implementation, the load manager 190 transmits, via the network interface 194, the load verification data 131, the cryptographic signature 133, or both, to the off-board device 102. In a particular implementation, the trusted computing device 184 transmits, via the network interface 194, the load verification data 131, the cryptographic signature 133, or both, to the off-board device 102.

The example 200 further includes authenticating a sender of the verification data, at 214. For example, the load verifier 120 of the off-board device 102 of FIG. 1 authenticates that the load verification data 131 is sent by the trusted computing device 184, the load manager 190, the software update target device 182, the aircraft 180, or a combination thereof, as described with reference to FIG. 1.

The example 200 also includes determining whether the sender is authenticated and the verification data is valid, at 216. For example, the load verifier 120 of the off-board device 102 of FIG. 1 authenticates whether the load verification data 131 is sent by the trusted computing device 184, the load manager 190, the software update target device 182, the aircraft 180, or a combination thereof, as described with reference to FIG. 1. The load verifier 120 also determines whether the load verification data 131 is valid based on determining whether the configuration data 147 matches the configuration data 117, the load events 143 match the expected load events 121, or both, as described with reference to FIG. 1.

The example 200 further includes determining that loading of the software 115 is valid, at 218. For example, the load verifier 120 of the off-board device 102 of FIG. 1, in response to determining that the configuration data 147 matches the configuration data 117, the load events 143 match the expected load events 121, or both, determines that loading of the software 115 is valid. The load verifier 120, in response to determining that the loading of the software 115 is valid, sends an approval message as the response message 135 to the software update target device 182, as described with reference to FIG. 1.

The example 200 also includes, in response to determining that the loading of the software 115 is valid, at 218, initiating execution of the software 115, at 220. For example, the load manager 190 of FIG. 1, in response to determining that the loading of the software 115 is valid, initiates execution of the software 115. In a particular aspect, the load manager 190 determines that the loading of the software 115 is valid in response to receiving an approval message as the response message 135.

The example 200 further includes determining that loading of the software 115 is compromised, at 222. For example, the load verifier 120 of the off-board device 102 of FIG. 1, in response to determining that the configuration data 147 does not match the configuration data 117, the load events 143 do not match the expected load events 121, or both, determines that loading of the software 115 is compromised. The load verifier 120, in response to determining that the loading of the software 115 is compromised, sends a disable message as the response message 135 to the software update target device 182, as described with reference to FIG. 1.

The example 200 also includes, in response to determining that the loading of the software 115 is compromised, at 222, preventing execution of the software 115, at 224. For example, the load manager 190 of FIG. 1, in response to determining that the loading of the software 115 is compromised, prevents execution of the software 115. In a particular aspect, the load manager 190 determines that the loading of the software 115 is compromised in response to receiving a disable message as the response message 135. In a particular implementation, the load manager 190 prevents execution of the software 115 by deleting (e.g., uninstalling) the software 115.

The example 200 thus illustrates use of a closed loop cryptographic chain of trust. For example, the load manager 190 authenticates, based on the digital signature 163, that the software 115 is received from the off-board device 102. The off-board device 102 authenticates, based on the cryptographic signature 133, that the load verification data 131 is received from the load manager 190. The off-board device 102 selectively enables execution of the software 115 at the aircraft 180, the software update target device 182, or both, based on verifying that the load verification data 131 is valid. For example, the off-board device 102, in response to determining that the configuration matches the expected configuration, that the load events 143 match the expected load events 121, or a combination thereof, sends an approval message as the response message 135 to the software update target device 182. The load manager 190, in response to receiving the approval message, enables execution of the software 115 at the software update target device 182, the aircraft 180, or both. Alternatively, the off-board device 102, in response to determining that the configuration does not match the expected configuration, that the load events 143 do not match the expected load events 121, or a combination thereof, sends a disable message as the response message 135 to the software update target device 182. The load manager 190, in response to receiving the disable message, prevents execution of the software 115 at the software update target device 182, the aircraft 180, or both.

Figure 3:
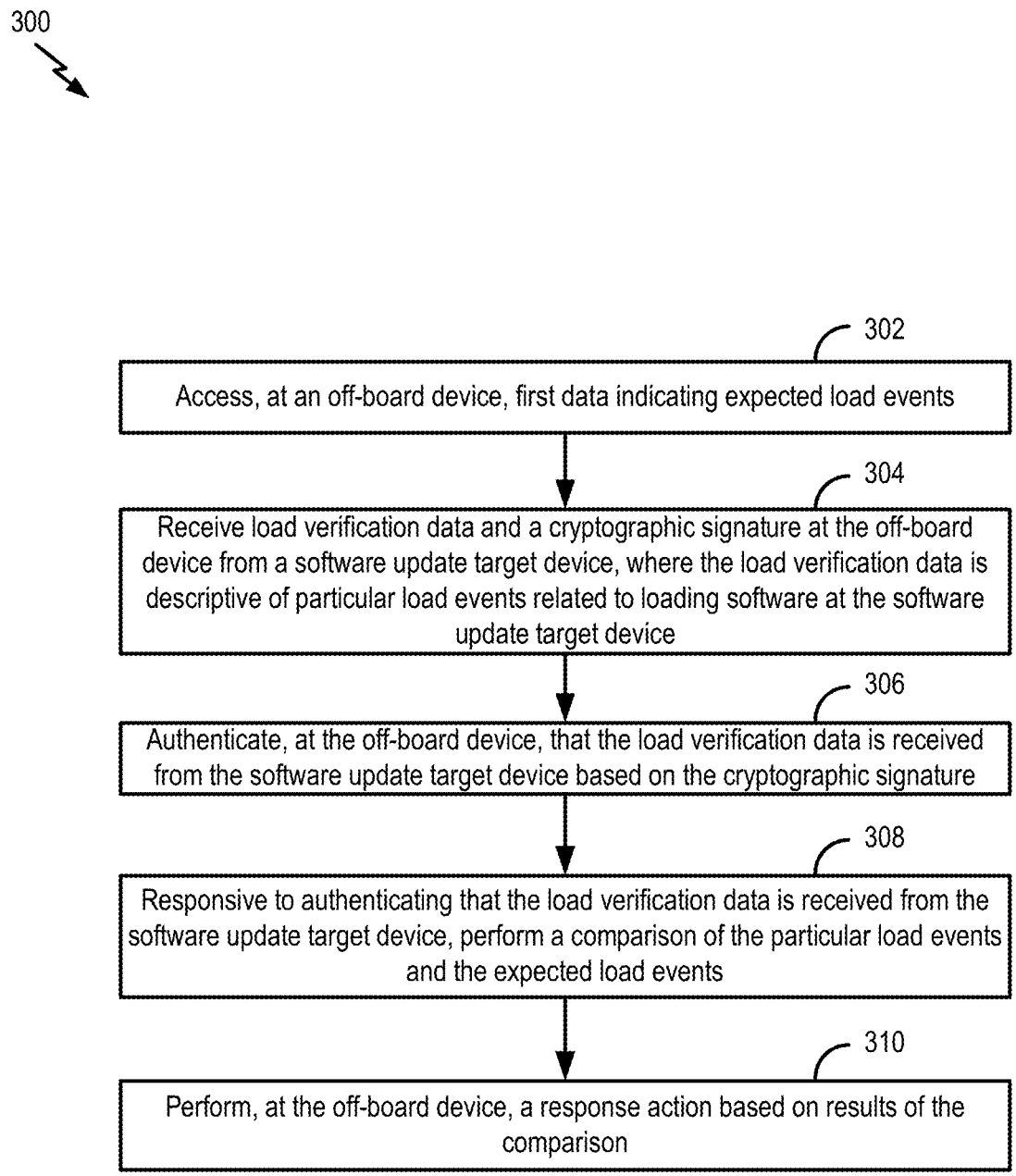
FIG. 3 is a flow chart that illustrates an example of a method of software load verification.

FIG. 3 is a flowchart of a method 300 of software load verification. The method 300 can be performed by one or more of the load verifier 120, the off-board device 102, or the system 100 of FIG. 1.

The method 300 includes accessing, at an off-board device, first data indicating expected load events, at 302. For example, the load verifier 120 of FIG. 1 accesses the data 111 indicating the expected load events 121, as described with reference to FIG. 1.

The method 300 also includes receiving load verification data and a cryptographic signature at the off-board device from a software update target device, at 304. For example, the load verifier 120 of the off-board device 102 of FIG. 1 receives the load verification data 131 and the cryptographic signature 133 from the software update target device 182, as described with reference to FIG. 1. The load verification data 131 is descriptive of the load events 143 related to loading the software 115 at the software update target device 182.

The method 300 further includes authenticating, at the off-board device, that the load verification data is received from the software update target device based on the cryptographic signature, at 306. For example, the load verifier 120 of the off-board device 102 of FIG. 1 authenticates, based on the cryptographic signature 133, that the load verification data 131 is received from the software update target device 182, as described with reference to FIG. 1.

The method 300 also includes, responsive to authenticating that the load verification data is received from the software update target device, performing a comparison of the particular load events and the expected load events, at 308. For example, the load verifier 120 of the off-board device 102 of FIG. 1, responsive to authenticating that the load verification data 131 is received from the software update target device 182, generates the results 113 based on a comparison of the load events 143 and the expected load events 121, as described with reference to FIG. 1.

The method 300 further includes performing, at the off-board device, a response action based on results of the comparison, at 310. For example, the load verifier 120 of the off-board device 102 of FIG. 1 performs a response action based on the results 113, as described with reference to FIG. 1. For example, the response action includes sending the response message 135 to the software update target device 182. To illustrate, the load verifier 120 generates an approval message as the response message 135 in response to determining that the results 113 indicate that the load events 143 match the expected load events 121. The approval message is sent to enable execution of the software 115 at the software update target device 182. Alternatively, the load verifier 120 generates a disable message as the response message 135 in response to determining that the results 113 indicate that the load events 143 do not match the expected load events 121. The load verifier 120 sends the response message 135 to the software update target device 182. The disable message is sent to prevent execution of the software 115 at the software update target device 182.

The method 300 thus enables the load verifier 120 to selectively enable execution of the software 115 at the software update target device 182. For example, the load verifier 120, in response to determining that the load events 143 match the expected load events 121, sends an approval message to the software update target device 182 to enable execution of the software 115 at the software update target device 182. Alternatively, the load verifier 120, in response to determining that the load events 143 do not match the expected load events 121, sends a disable message to the software update target device 182 to prevent execution of the software 115 at the software update target device 182.

Figure 4:
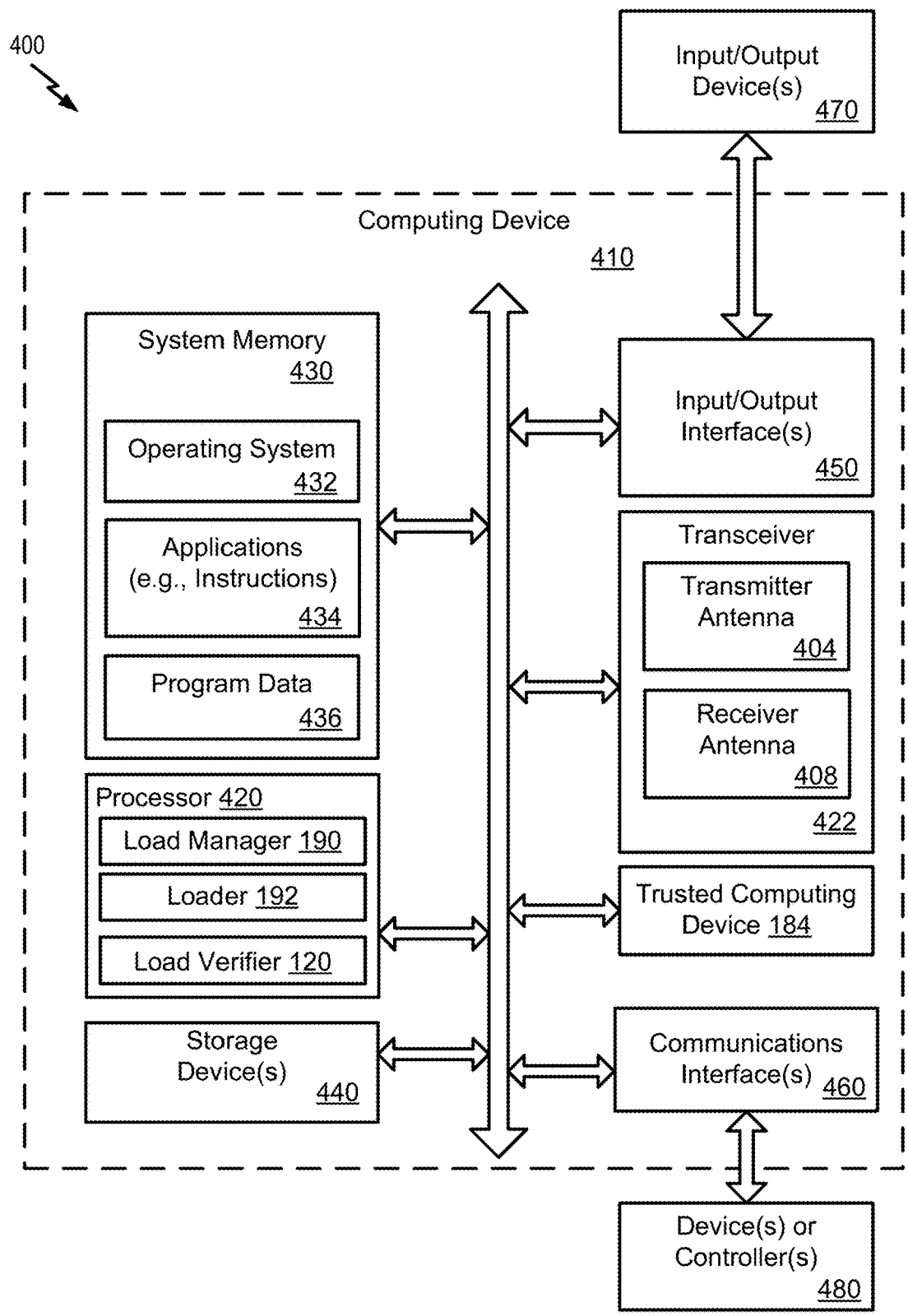
FIG. 4 is a block diagram that depicts a computing environment including a computing device configured to support aspects of computer-implemented methods and computer-executable program instructions (or code) according to the present disclosure.

FIG. 4 is an illustration of a block diagram of a computing environment 400 including a computing device 410 configured to support aspects of computer-implemented methods and computer-executable program instructions (or code) according to the present disclosure. For example, the computing device 410, or portions thereof, is configured to execute instructions to initiate, perform, or control one or more operations described with reference to FIGS. 1-3.

The computing device 410 includes the transceiver 422. The transceiver 422 includes a transmitter antenna 404 and a receiver antenna 408. The computing device 410 includes a processor 420. In a particular aspect, the processor 420 includes the load manager 190, the loader 192, the load verifier 120, or a combination thereof. The processor 420 is configured to communicate with system memory 430, one or more storage devices 440, one or more input/output interfaces 450, one or more communications interfaces 460, or a combination thereof. The system memory 430 includes volatile memory devices (e.g., random access memory (RAM) devices), nonvolatile memory devices (e.g., read-only memory (ROM) devices, programmable read-only memory, and flash memory), or both. The system memory 430 stores an operating system 432, which may include a basic input/output system for booting the computing device 410 as well as a full operating system to enable the computing device 410 to interact with users, other programs, and other devices. The system memory 430 stores system (program) data 436. In a particular aspect, the memory 132 of FIG. 1 includes the system memory 430, the one or more storage devices 440, or a combination thereof.

The system memory 430 includes one or more applications 434 executable by the processor 420. As an example, the one or more applications 434 include instructions executable by the processor 420 to initiate, control, or perform one or more operations described with reference to FIGS. 1-3. To illustrate, the one or more applications 434 include instructions executable by the processor 420 to initiate, control, or perform one or more operations described with reference to the load verifier 120, the load manager 190, the loader 192, or a combination thereof. In a particular aspect, the processor 186 of FIG. 1 corresponds to the processor 420. In a particular aspect, the computing device 410 includes the trusted computing device 184. The trusted computing device 184 is configured to monitor operations of the processor 420, as described with reference to FIG. 1.

The processor 420 is configured to communicate with one or more storage devices 440. For example, the one or more storage devices 440 include nonvolatile storage devices, such as magnetic disks, optical disks, or flash memory devices. In a particular example, the storage devices 440 include both removable and non-removable memory devices. The storage devices 440 are configured to store an operating system, images of operating systems, applications, and program data. In a particular aspect, the system memory 430, the storage devices 440, or both, include tangible computer-readable media. In a particular aspect, one or more of the storage devices 440 are external to the computing device 410.

The processor 420 is configured to communicate with one or more input/output interfaces 450 that enable the computing device 410 to communicate with one or more input/output devices 470 to facilitate user interaction. The processor 420 is configured to detect interaction events based on user input received via the input/output interfaces 450. Additionally, the processor 420 is configured to send a display to the display 110 of FIG. 1 via the input/output interfaces 450. In a particular aspect, the input/output interfaces 450 include the display interface 126 of FIG. 1. The processor 420 is configured to communicate with devices or controllers 480 via the one or more communications interfaces 460. For example, the one or more communications interfaces 460 include the network interface 130, the network interface 194 of FIG. 1, or both. In an illustrative example, a non-transitory computer-readable storage medium (e.g., the system memory 430) includes instructions that, when executed by a processor (e.g., the processor 420), cause the processor to initiate, perform, or control operations. The operations include one or more operations described with reference to FIGS. 1-3.

Figure 5:
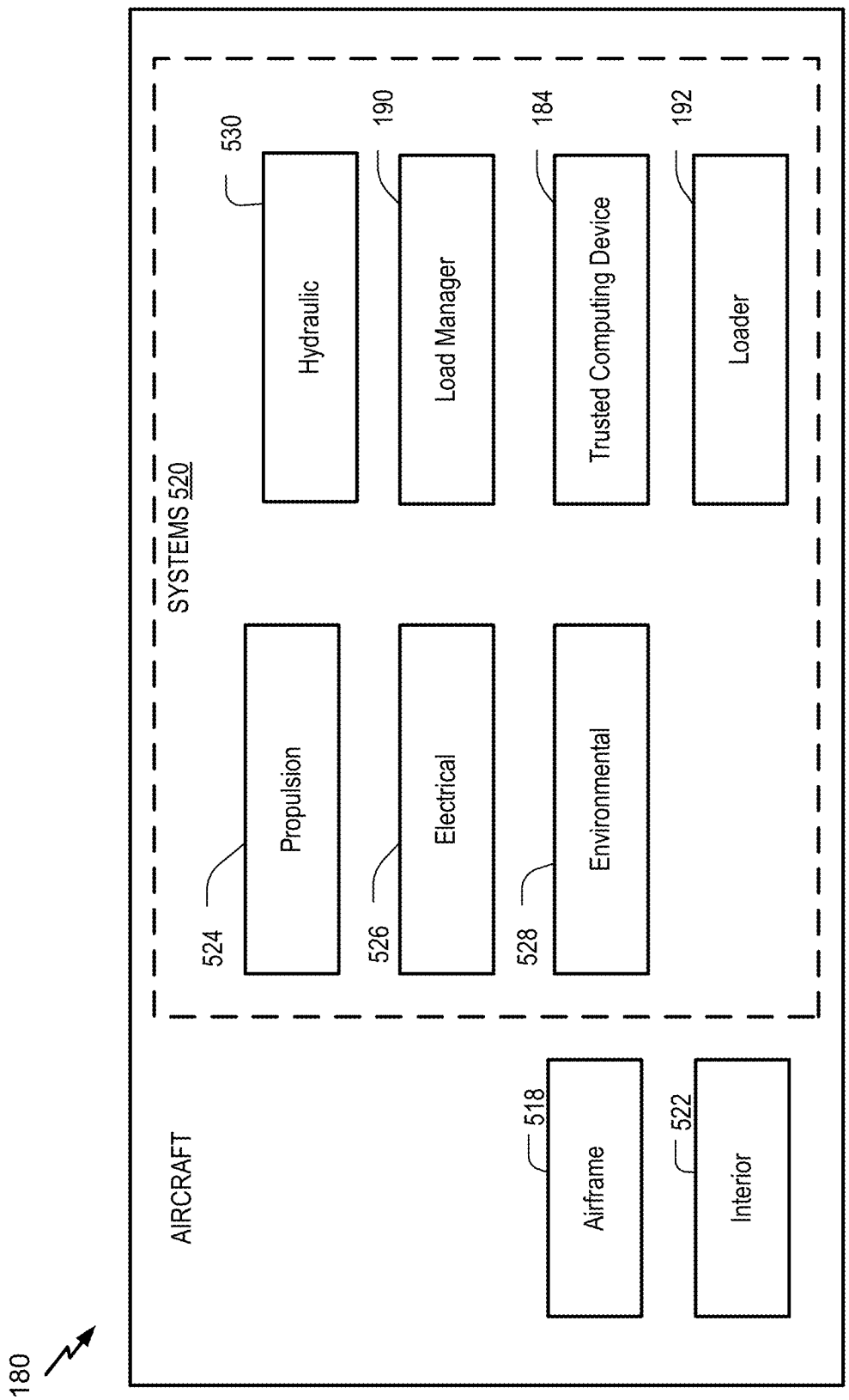
FIG. 5 is a block diagram of an aircraft configured to support aspects of computer-implemented methods and computer-executable program instructions (or code) according to the present disclosure.

Aspects of the aircraft 180 are shown in FIG. 5. The aircraft 180 includes an airframe 518 with a plurality of systems 520 (e.g., high-level systems) and an interior 522. Examples of the systems 520 include one or more of a propulsion system 524, an electrical system 526, an environmental system 528, a hydraulic system 530, the load manager 190, the trusted computing device 184, and the loader 192. Other systems can also be included.

The load manager 190, the trusted computing device 184, the loader 192, or a combination thereof, are configured to support aspects of computer-implemented methods and computer-executable program instructions (or code) according to the present disclosure. For example, the load manager 190, the trusted computing device 184, the loader 192, or portions thereof, are configured to execute instructions to initiate, perform, or control one or more operations described with reference to FIGS. 1-4. Although an aerospace example is shown, the present disclosure can be applied to other industries. For example, the load manager 190, the trusted computing device 184, the loader 192, or a combination thereof, can be used onboard a manned or unmanned vehicle (such as a satellite, a watercraft, or a land-based vehicle), in a building or other structure.

Although one or more of FIGS. 1-5 illustrate systems, apparatuses, and/or methods according to the teachings of the disclosure, the disclosure is not limited to these illustrated systems, apparatuses, and/or methods. One or more functions or components of any of FIGS. 1-5 as illustrated or described herein may be combined with one or more other portions of another of FIGS. 1-5. For example, one or more elements of the method 300 of FIG. 3 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-4 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A system to perform software load verification, the system comprising:
    a memory configured to store:
        first data indicating expected load events that are expected to occur during loading software;
        first configuration data indicating an expected configuration of a software update target device;
    a network interface configured to receive load verification data and a cryptographic signature from the software update target device, wherein the load verification data is descriptive of particular load events occurring during loading software at the software update target device, wherein the first configuration data is distinct from the load verification data, wherein the load verification data includes second configuration data indicating configuration of the software update target device prior to loading of the software, and wherein the second configuration data is distinct from the first data; and
a processor configured to:
  authenticate that the load verification data is received from the software update target device based on the cryptographic signature;
  responsive to authenticating that the load verification data is received from the software update target device, perform a comparison of the particular load events and the expected load events;
  perform a second comparison of the first configuration data and the second configuration data;
  perform a response action based on results of the comparison and the second comparison; and
  responsive to determining that the particular load events match the expected load events, update the first configuration data based on the load verification data.

2. The system of claim 1, wherein the load verification data includes times data identifying a time difference corresponding to a first load event of the particular load events and a second load event of the particular load events.

3. The system of claim 2, wherein the first data identifies an expected time difference corresponding to a first expected load event of the expected load events and a second expected load event of the expected load events, wherein the first load event corresponds to the first expected load event, wherein the second load event corresponds to the second expected load event, and wherein performing the comparison of the particular load events and the expected load events comprises comparing the time difference and the expected time difference.

4. The system of claim 1, wherein, responsive to determining that the particular load events match the expected load events, the response action includes sending an approval message to the software update target device.

5. The system of claim 1, wherein responsive to determining that the particular load events do not match the expected load events, the response action includes sending a disable message to the software update target device to prevent execution of the software at the software update target device.

6. The system of claim 1, wherein the particular load events include the software update target device performing a data write operation to a particular type of device during the loading of the software, the software update target device initiating a boot process during the loading of the software, the software update target device generating a signature during the loading of the software, the software update target device detecting an error during the loading of the software, or a combination thereof.

7. The system of claim 1, wherein the software update target device is integrated into an aircraft.

8. An aircraft comprising:
a network interface configured to receive, via a network from an off-board device, a software package that includes software; and
a processor configured to:
  authenticate, based on a digital signature, that the software is received from the off-board device; and
  responsive to authenticating the software:
    perform particular load events to load the software at a software update target device;
    cause the network interface to send load verification data and a cryptographic signature to the off-board device, the load verification data descriptive of the particular load events, wherein the load verification data includes first configuration data indicating configuration of the software update target device prior to loading of the software;
    receive, via the network interface, a response message from the off-board device, the response message based on analysis of the load verification data and the cryptographic signature at the off-board device, wherein the off-board device performs a first comparison of the particular load events and expected load events that are expected to occur during loading software, wherein the off-board device performs a second comparison of the first configuration data to second configuration data indicating an expected configuration of the software update target device, wherein the first configuration data is distinct from the load verification data, and wherein the off-board device updates the first configuration data based on the load verification data; and
    selectively execute the software based on the response message.

9. The aircraft of claim 8, further comprising a trusted computing device configured to:
monitor operations performed by the processor during loading of the software; and
generate a list of the particular load events based on the monitored operations, wherein the load verification data is based on the list of the particular load events.

10. The aircraft of claim 8, wherein the load verification data identifies an ordered list of the particular load events.

11. The aircraft of claim 8, wherein the processor is configured to prevent execution of the software based on determining that the response message indicates that the particular load events do not match expected load events.

12. The aircraft of claim 8, wherein the processor is further configured to, prior to loading the software, generate the first configuration data.

13. A method of performing software load verification, the method comprising:
accessing, at an off-board device, first data indicating expected load events that are expected to occur during loading software;
accessing, at the off-board device, first configuration data indicating an expected configuration of the software update target device;
receiving load verification data and a cryptographic signature at the off-board device from the software update target device, the load verification data is descriptive of particular load events occurring during loading the software at the software update target device, wherein the first configuration data is distinct from the load verification data, wherein the load verification data includes second configuration data indicating configuration of the software update target device prior to loading of the software, and wherein the second configuration data is distinct from the first data;
authenticating, at the off-board device, that the load verification data is received from the software update target device based on the cryptographic signature;

responsive to authenticating that the load verification data is received from the software update target device, performing a comparison of the particular load events and the expected load events;

performing a second comparison of the first configuration data and the second configuration data;

performing, at the off-board device, a response action based on results of the comparison and the second comparison; and responsive to determining that the particular load events match the expected load events, updating the first configuration data based on the load verification data.

14. The method of claim 13, wherein, responsive to determining that the particular load events match the expected load events, the response action includes sending an approval message to the software update target device.

15. The method of claim 13, wherein responsive to determining that the particular load events do not match the expected load events, the response action includes sending a disable message to the software update target device to prevent execution of the software at the software update target device.

16. The method of claim 13, wherein the particular load events include the software update target device performing a data write operation to a particular type of device during the loading of the software, the software update target device initiating a boot process during the loading of the software, the software update target device generating a signature during the loading of the software, the software update target device detecting an error during the loading of the software, or a combination thereof.

17. The method of claim 13, wherein the software update target device is integrated into an aircraft.

18. The method of claim 13, further comprising generating the load verification data at a trusted computing device of the software update target device.

19. The method of claim 13, further comprising:

receiving a software package at the software update target device; and authenticating the software package based on a digital signature, wherein the particular load events are performed at the software update target device responsive to the authenticating the software package.

20. The method of claim 19, further comprising:

receiving a response message at the software update target device from the off-board device, wherein performing the response action at the off-board device includes sending the response message from the off-board device to the software update target device; and selectively executing the software at the software update target device based on the response message.

* * * * *